(12) United States Patent
McBrearty et al.

(10) Patent No.: US 6,744,452 B1
(45) Date of Patent: Jun. 1, 2004

(54) INDICATOR TO SHOW THAT A CACHED WEB PAGE IS BEING DISPLAYED

(75) Inventors: Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,815

(22) Filed: May 4, 2000

(51) Int. Cl.[7] .............................................. G06F 13/00
(52) U.S. Cl. ...................................... 345/853; 345/348
(58) Field of Search .................................. 345/762, 765, 345/744, 840, 848, 854; 707/201, 202, 203, 206

(56) References Cited

U.S. PATENT DOCUMENTS

| | | | | |
|---|---|---|---|---|
| 6,011,537 A | * | 1/2000 | Slotznick | 345/763 |
| 6,243,089 B1 | * | 5/2001 | Gong | 345/744 |
| 6,253,234 B1 | * | 6/2001 | Hunt et al. | 707/10 |
| 6,327,598 B1 | * | 12/2001 | Kelly et al. | 707/513 |
| 6,366,947 B1 | * | 4/2002 | Kavner | 709/203 |
| 6,405,192 B1 | * | 6/2002 | Brown et al. | 707/3 |
| 6,449,695 B1 | * | 9/2002 | Bereznyi et al. | 711/134 |
| 6,539,406 B1 | * | 3/2003 | Ibarra et al. | 707/513 |

* cited by examiner

*Primary Examiner*—Cao (Kevin) Nguyen
(74) *Attorney, Agent, or Firm*—Volel Emile; Bracewell & Patterson, L.L.P.

(57) ABSTRACT

A modified web browser application on a data processing system for use in searching the Internet and displaying web pages. The modified web browser has a cache area which caches/stores a copy of a web page downloaded from the internet. When a particular page is requested, logic components within the modified web browser determine if the particular page is resident in the cache area. If the particular page is resident in the cache area, it is displayed within the modified web browser with an indicator by which the user is notified that the particular page displayed is cached. In one embodiment, the indicator is a cache message button which is displayed within the we browser. In another embodiment, the indicator is a color coded scheme which causes the web page or web page border to be displayed in a different color whenever the particular page is cached.

22 Claims, 9 Drawing Sheets

INDICATOR TO SHOW THAT A CACHED WEB PAGE IS BEING DISPLAYED

RELATED APPLICATIONS

The present invention relates to the subject matter of the following commonly assigned, U.S. patent application Ser. No. 09/564,817 entitled "Indicator To Show That A Cached File Is Being Displayed On A Client System" filed concurrently herewith.

BACKGROUND OF THE INVENTION

1. Technical Field

The present invention relates in general to displaying web pages on a web browser and in particular to the caching and displaying of web pages downloaded from the Internet using a web browser. Still more particularly, the present invention relates to method and system for identifying cached web pages to a user using a modified web browser.

2. Description of the Related Art

The development of computerized distributed information resources, such as the "Internet," allows users to link with servers and networks, and thus retrieve vast amounts of electronic information heretofore unavailable in an electronic medium. Such electronic information increasingly is displacing more conventional means of information transmission, such as newspapers, magazines, and event television. The term "Internet" is an abbreviation for "Internetwork," and refers commonly to a collection of computer networking. TCP/IP is an acronym for "Transport Control Protocol/Internet Protocol," a software protocol developed by the Department of Defense for communication between computers.

Internet services are typically accessed by specifying a unique address, or universal resource locator (URL). The URL has two basic components, the protocol to be used, and the object pathname. For example, the URL "http://www.uspto.gov" (home page for the United States Patent & Trademark Office) specifies a hypertext transfer protocol ("http") and a pathname of the server ("www.uspto.gov"). The server name is associated with a unique numeric value (a TCP/IP address, or "domain").

The Internet has rapidly become a valuable source of information to all segments of society. In addition to commercial enterprises utilizing the Internet as an integral part of their marketing efforts in promoting their products or services, many federal, state, and local government agencies are also employing Internet sites for informational purposes, particularly agencies which must interact with virtually all segments of society such as the Internal Revenue Service. The information provided is often updated regularly to keep the users up to date with changes which may occur from time to time.

The World Wide Web (Web) is a graphic, interactive interface for the Internet. There are different programs (web browser clients, referred to hereinafter as web browser) on a data processing system (also referred to as a computer) connected to the Web that are utilized to access servers (a program on another data processing system) connected to the Web. The program on the server is generally termed a "web site." Web sites are a collection of "web pages," where web pages are graphic displays which are usually linked together and may be downloaded to a data processing system utilizing a browser client. Each web page has a unique address, or Universal Resource Locator (URL) within the Web that is accessible by utilizing Transfer Control Protocol/Internet Protocol (TCP/IP) transactions via telecommunication networks and a modem. The address allows Internet "browser" clients (computer program applications) to connect and communicate with a HyperText Transfer Protocol (HTTP) server over the Web.

Retrieval of information on the Web is generally accomplished with a hypertext markup language (HTML)—compatible "browser"—an application program capable of submitting a request for information identified by an URL—at the client machine. The information is provided to the client formatted according to HTML.

Each WWW address specifies or implies a reference to one particular site on the Internet. This means that without some kind of additional machinery, whenever a person requests a specific WWW address, no matter where she is from and no matter how often others in her network request the same address, she will make a network call to that specific site, leading to unnecessarily high use of network links and excessive load on the servers for popular sites.

High use of network lines and excessive load on popular servers leads to one of the single biggest problems experienced by Internet users today: lack of adequate bandwidth. Information abounds on the Internet, but the delay involved in retrieving that information frustrates many users. Until the Internet infrastructure upgrades to bigger "pipes" which can transmit greater amounts information in the same amount of time, Web surfers must look to other means to relieve the congestion.

When Web pages are retrieved under direct user control, it is common practice for contemporary Web browsers to cache pages accessed by the user. Large traffic demands to specific Web sites can make access to such sites difficult. The amount of time which a user must wait to view a Web page during peak utilization periods can be very long. Network bandwidth is finite, and the time required to retrieve a Web page depends in part on the number of servers at the site from which the Web page is being retrieved. Furthermore, Web pages often include sizable graphics files or other large files requiring a substantial amount of time to transfer from the source to the requesting client. Caching Web pages allows a user to repeatedly view the information within a short span of time without retrieving the Web pages each time. It provides a local (or networked) copy of a web page previously retrieved off the Internet to speed up reloading of the page when desired.

Caching is a generic term meaning "to store." It typically is completed to avert internet traffic. As applied to the Internet, "caching" means the copying of a web page, made incidental to the first access to the page, and storage of that copy for that purpose of speeding subsequent access.

Caching helps to relieve Internet congestion by expediting user access time, decreasing the amount of bandwidth each user uses and bandwidth used on the Internet generally, on network servers, and on remote servers.

There are two ways to cache web pages on the Internet: "client caching" and "proxy caching." Client caches reside within an individual user's Web browser (such as Netscape or Mosaic). Client caching takes two forms: persistent and non-persistent. A persistent client retains its documents between invocations of the Web browser. Netscape uses a persistent cache. A non-persistent client cache (used in Mosaic) removes any memory or disk space used for caching when the user quits the browser.

When the user's computer requests a website, the computer will first check to see if the data requested already resides in the cache. If the cache has a copy of the requested data then the cache provides the data very quickly to the user. If the data is not in the cache, the computer fetches the item needed from the Internet, and also stores a copy in the cache. Now the cache has this data available if the processor requests it again. The larger the cache, the more data the cache can store and the more likely the cache will have the requested item.

The second form of caching, "proxy caching. " takes place on a network used by the World Wide Web ("WWW" or "Web"). Proxy caches reside on machines in strategic places (typically gateways) in the network of the WWW. Proxy servers act as intermediaries between local clients and remote content servers. Caching of Web pages is also performed at proxies. Thus, caching in proxies, which serve an entire intranet, can benefit the entire local network.

When a user asks a client for a certain web page, the client heads out to the Internet. If there is a caching proxy, client requests go to the proxy server, not to the remote web page. The proxy checks to see if it has already cached the requested page on the proxy server. If the server has cached a copy of the web page, the server returns the page to the client directly. Reporting cached information to clients occurs rapidly because it requires reduced internet activity. Caching reduces the computational load on the remote content server and makes it possible for that server to supply data to more machines exponentially. If the server does not have a cached copy of the requested document, the server goes out to the remote web page server, finds the original, and passes the data back to the client at the same time keeping a copy on its cache.

As described above, when users request information from a remote website, they may in fact receive that information from a cache (either local cache or proxy cache). If the cache information is "stale" (i.e. the remote website has changed its content since it was cached) the user has received, at best, outdated information and, at worst, harmful and misleading information. The degree of the threat of stale information depends on the nature of the website's content. If a user requests today's Dilbert cartoon, but receives yesterday's cartoon because the cache has not updated yet, the user suffers little harm beyond annoyance.

However, when the user utilizes the Internet for financial transactions, for example, when investing money based on a cached page of the NYSE ticker page or relying on stock quotes, the time of the information received and displayed on the web page has to be the most current information available. Financial and other similar sites may change their information regularly (i.e., perhaps every 15 minutes, or every 10 seconds). In such a situation, information present on a web site when it is first downloaded and cached may be vastly different from the information available 30 seconds later when the site is desired to be revisited.

Thus, in the current world wide web situation, it is very possible and sometimes common for a web pages to be updated regularly. Some pages, such as financial pages, need to be viewed with the latest data by those interested in a quickly changing situation. However, the web browser cache can sometimes display cached data without the users knowledge. In fact, this is more often the case that the cached page is displayed rather than a freshly downloaded page. Some pages may contain a time/date stamp; however the page manager determines if to include a stamp and most pages are not time/dated. In some instances, the software/ application is set to automatically update the time/date each time the document is accessed giving the user the perception that the document has just been retrieved. Thus the stamp does not necessarily indicate to a user that the page was cached. In instances when the updates are irregular and the stamp is of the time of the last update, the stamp provides little useful information to the user concerning the status of the displayed copy. Thus, the time/date stamp is an unreliable indicator about the status of the document being retrieved.

Current caching technology for non-web browsers is understandably hidden as users of these programs (or operating system) do not want to be notified when the data being used is cached data. However, on a web browser, sometimes it's okay to used cached data and sometimes it is unacceptable to use cached data. For this reason, web browsers are typically designed with a "reload" (or refresh) button by which the user may manually override the use of cached data. However, currently users cannot tell or guess correctly if what they are reading before them is cached data or not. Depending on the preferences for the individual user's browser, web page caching cannot be easily predicted from browser to browser on each person's workstation.

Often during operation, current browser technology tries to contact a sever site. If it unable to do so, but it has a previously cached page from the same site, a pop-up message will notify the user that the program is using cached data instead. However, this notification only covers cases where a server site is unreachable. It does not cover the case where the user is heavily using the "Back" and "Forward" options on a browser. In that case, the user is heavily using cached data with an occasional non-cached page inserted into the path.

Some prior art methods permits periodical retrieval of newer copies of a cached web page. In this method, a timer based mechanism is alerted to download a new copy of the web page from the server and store it in the cache location. This method thus provides a current copy of the web page information if it is accessed on screen immediately after the cache retrieval operation. At all other times the cached page is still "stale."

In other prior art methods, as implemented in AOL 4.0, a user is provided with the option of determining upon startup of the browser application, whether he wishes a every request for a page to be responded to with a cached page or with a newer version of the page. No indication is provided to the user as to whether the page information has changed and the user is forced to wait while the request is sent over the Internet even when a cached page would be appropriate.

Another potential problem exists when there is more than one user of a web browser application on a terminal/ computer. With settable browsers, the primary user may set the browser application to always utilize cached pages. When a second user attempts to use the browser for downloading web pages, he has no way of knowing that the page is a cached page when the first user had previously downloaded the web page.

The present invention recognizes that it would therefore be desirable to have a method and system for distinguishing to a user whether a displayed web page is a cached web page or newly downloaded web page.

SUMMARY OF THE INVENTION

It is therefore one object of the present invention to provide an improved method and system for displaying web pages on a web browser.

It is another object of the present invention to provide an improved method and system for displaying cached web pages on a web browser.

It is yet another object of the present invention to provide an improved method and system for identifying cached web pages to a user via a modified web browser application.

The foregoing objects are achieved as is now described. A modified web browser application on a data processing system for use in searching the Internet and displaying web pages is disclosed. The modified web browser has a cache area which caches/stores a copy of a web page downloaded from the Internet. When a particular page is requested, logic components within the modified web browser application determine if the particular page is resident in the cache area. If the particular page is resident in the cache area, it is displayed within the modified web browser along with an indicator by which the user is notified that the particular page displayed is cached. In one embodiment, the indicator is a cache message button which is displayed within the web browser. In another embodiment, the indicator is a color coded scheme which causes the web page or web page border to be displayed in a different color whenever the particular page is cached. In a third embodiment, the indicator is presented as an interactive dialog box having instructions to the user to select a refresh option if display of the cached paged is not desired. In yet another embodiment, the indicator or dialog box indicates to the user the location of the cached document (i.e., local cache or proxy cache).

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIGS. 3A, 3B, and 3C-1, 3C-2 depict a web browser with a web page, which has been previously cached according to the teachings of the present invention;

DESCRIPTION OF AN ILLUSTRATIVE EMBODIMENT

Figure 1:
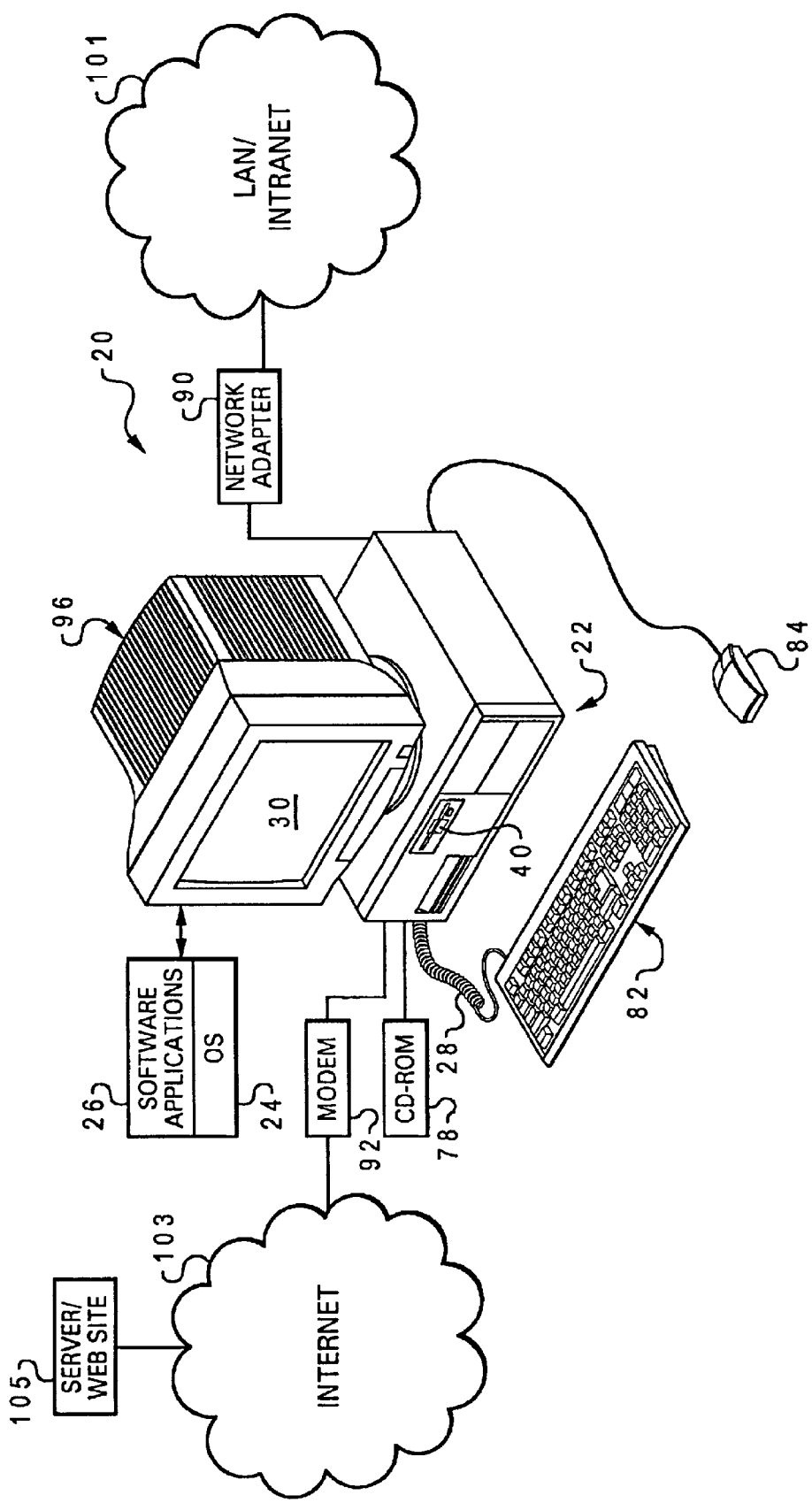
FIG. 1 is a diagram of an Internet connected data processing system, including remote servers.

The present invention is directed to a method, system, and data processor program application which provides a user of a web browser with an indication of whether a requested web page being displayed is a cached web page or a newly downloaded web page (i.e. downloaded from the web site via the Internet). The invention is preferably implemented in the data processing system and connected network as illustrated in FIG. 1. The invention may, however, be implemented in other types of data processing systems and networks so, while the present invention may be described with reference to FIG. 1, this reference should not be construed in a limiting sense.

Turning now to FIG. 1, a data processing system 20 connected to the Internet 103 and an intranet network 101 is shown, in which the present invention can be practiced. The data processing system 20 comprises a central processing unit (CPU) housed in a casing 22. Casing 22 also holds various hardware components including disk drive 40, and memory devices (not shown). Stored within memory devices re the operating system (OS) 24 and software applications 26, which include modified web browser application utilized to implement the present invention. The OS typically include software for controlling the allocation and usage of hardware resources such as memory, CPU time, disk space, and peripheral devices. The operating system thus operates as a foundation upon which applications, such as web browser applications, are built.

Several peripheral input/output (I/O) devices are connected to the CPU. These I/O devices include keyboard 82, mouse 84, and display monitor 96. Keyboard 82 is coupled to processor 22 by a cable 28. Display monitor 96 includes display screen 30, which may be implemented using a cathode ray tube (CRT), a liquid crystal display (LCD), an electrode luminescent panel or the like. Display unit 96 is utilized to provide graphical user interface (GUI), which allows user interaction with software applications 26 (such as a web browser application in the present invention) during execution of the application. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such a modem 92, CD-ROM 78, network adapter 90, and floppy disk drive 40, each of which may be internal or external to the enclosure or processor 22. Various other output devices, such as a printer (not shown) may also be coupled with processor 22.

Data processing system 20 is illustrated connected to a local area network (LAN) or Intranet 101. This permits one embodiment of the invention as will be discussed later. In the preferred embodiment, data processing system 20 is connected to Internet 103 which permits it to access server/web sites 105 to download web pages during browsing on the Internet 103.

Those skilled in the art appreciate that data processing system 20 may be connected to Internet 103 via proxies or alternatively via the LAN server (not shown). This and other embodiments all fall within the coverage of the present invention. Further, the present invention may be executed in a variety of systems, including a variety of computers having a number of different operating systems. The computer may be, for example, a personal computer, a network computer, a server, a midrange computer or a mainframe computer. In addition, the computer may be a stand-alone system or part of a network such as a local-area network (LAN) or a wide-area network (WAN). For the purposes of illustration, the preferred embodiment of the present invention is described with reference to a personal computer; however, other forms of web access units, besides the traditional data processing system, are contemplated within the scope of the invention. These include direct web access units using a standard television (commonly referred to as Web TV) or the like.

Computer system 20 also preferably includes an interface such as a graphical user interface (GUI) and an operating system (OS) 24 that reside within machine readable media to direct the operation of computer system 20. Any suitable machine-readable media may retain the GUI and OS, such as RAM, ROM, SCSI disk drive, and other disk and/or tape drive(e.g. magnetic diskette, magnetic tape, CD-ROM, optical disk, or other suitable storage media). Also, any suitable GUI and OS may direct the processing unit of the data processing system 20.

Further, computer system 20 preferably includes at least one software application(program product) 26 that resides within machine readable media. The software application may be accessible by an operating system, or may be incorporated into an operating system control program. Preferably, the software application contains instructions that when executed on the processing unit carry out the particular operations of the present invention as described herein. In particular, a software application of the present invention (i.e. a modified web browser) displayed as a GUI will receive a user request for a particular web page address, implement searching of Internet or Intranet network for the particular web page address, retrieve/download the contents of the web page address to the local data processing system and store a temporary copy of the data in data processing system cache. Typical software applications which perform these functions are provided by browsers, proxy servers, and other distributed devices which provide access to the Internet and typically store a temporary copy of any web pages accessed. In particular, a software application of the present invention also checks a request for a web page address against the web pages stored in the local cache and when the web page address is found, retrieves the requested web page from the local cache. The web page is then displayed along with an indicator, which informs the user that a cached version of the web page (i.e., not a newly downloaded version) was retrieved.

Figure 2:
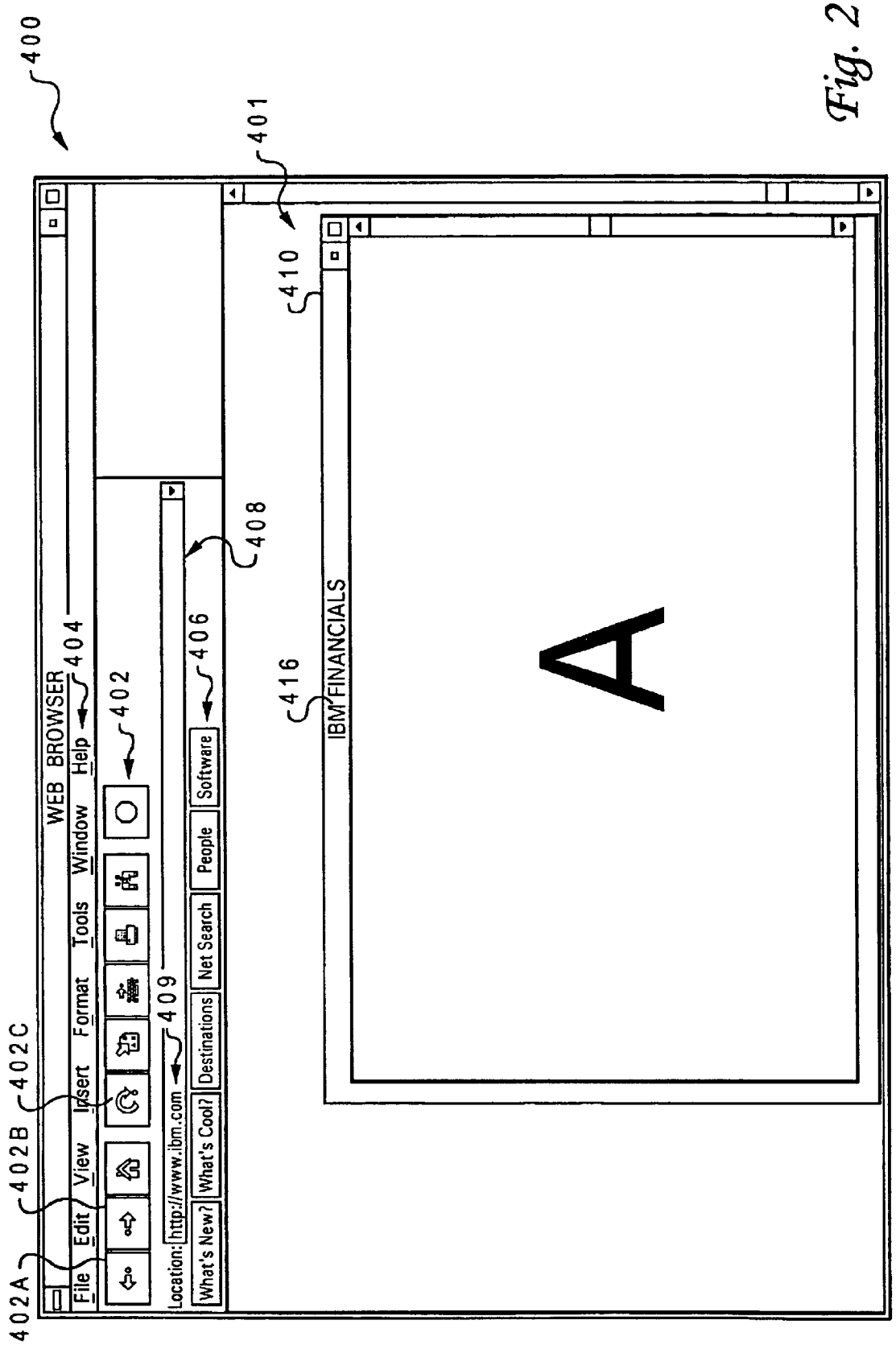
FIG. 2 depicts a web browser with a web page as originally downloaded from the Internet.

Referring now to FIG. 2, a web browser in accordance with a preferred implementation of the present invention is depicted. Web browser 400 is a graphical user interface (GUI) on a display monitor of a data processing system. Web browser 400 includes a number of selection buttons 402 such as next and previous buttons 402A and 402B that may be used to switch between web pages that have been retrieved and refresh button 402C which forces the retrieval of a requested web page directly from the web site (i.e., not from cache). Web browser 400 also includes a number of menu selection items 404, and alternate selection buttons 406. Browser window 400 also has a search parameter field 408 for entering the URL 409 of the desired web pages on the Internet. In the illustrated embodiment, the URL for IBM, "www.ibm.com" is entered. Upon selection of URL 409 by selecting net search button 414, a web page 410 of the desired site (IBM) is downloaded and displayed within display area 401 of web browser 400. Downloaded web page 410 is illustrated having standard borders. Additionally, web browser 400 has no noticeable indication of a cached page. This is interpreted by a user to mean that the web page 410 displayed has not been retrieved from the web browser cache.

Figure 3A:
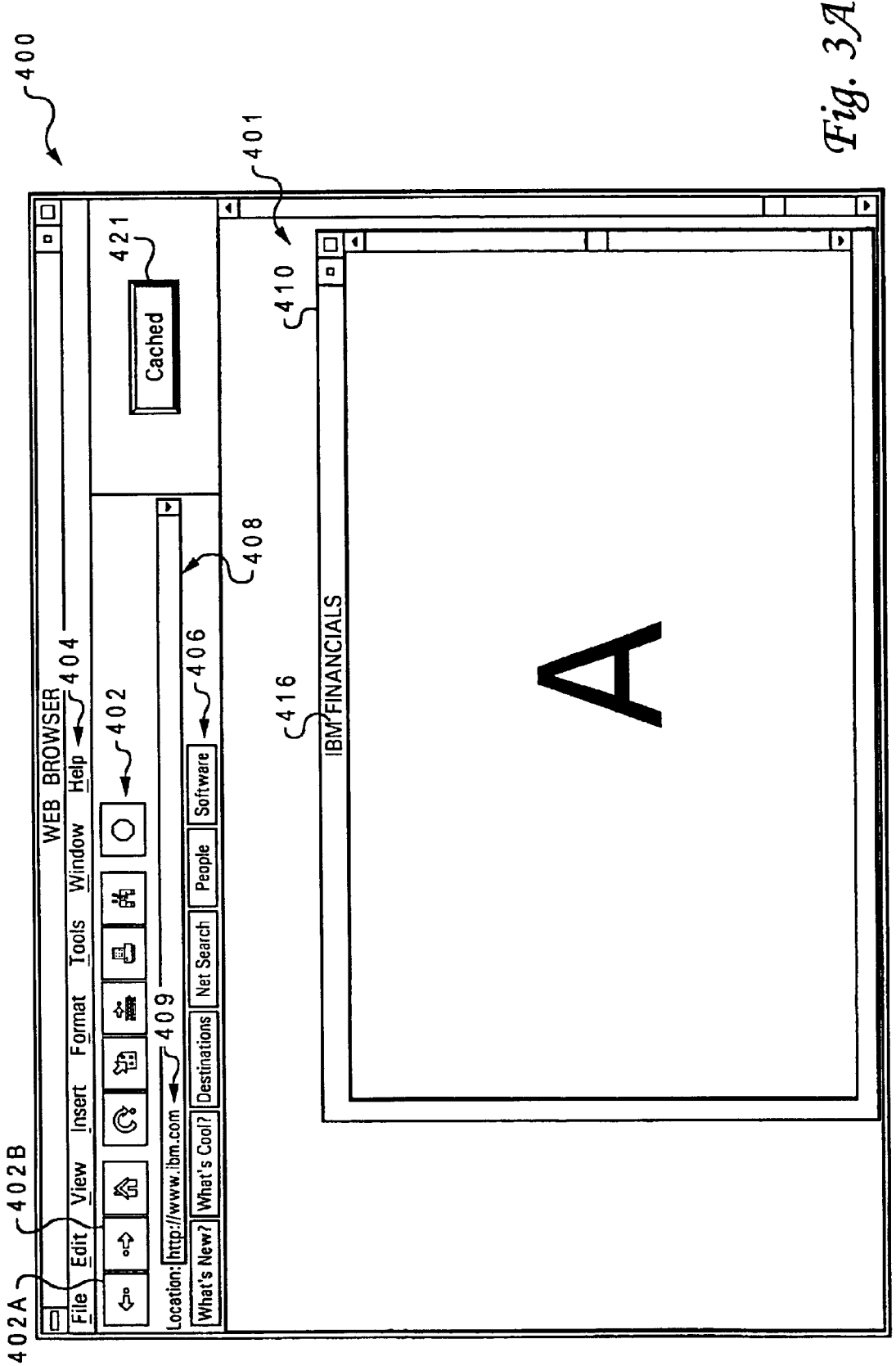
Figure 3B:
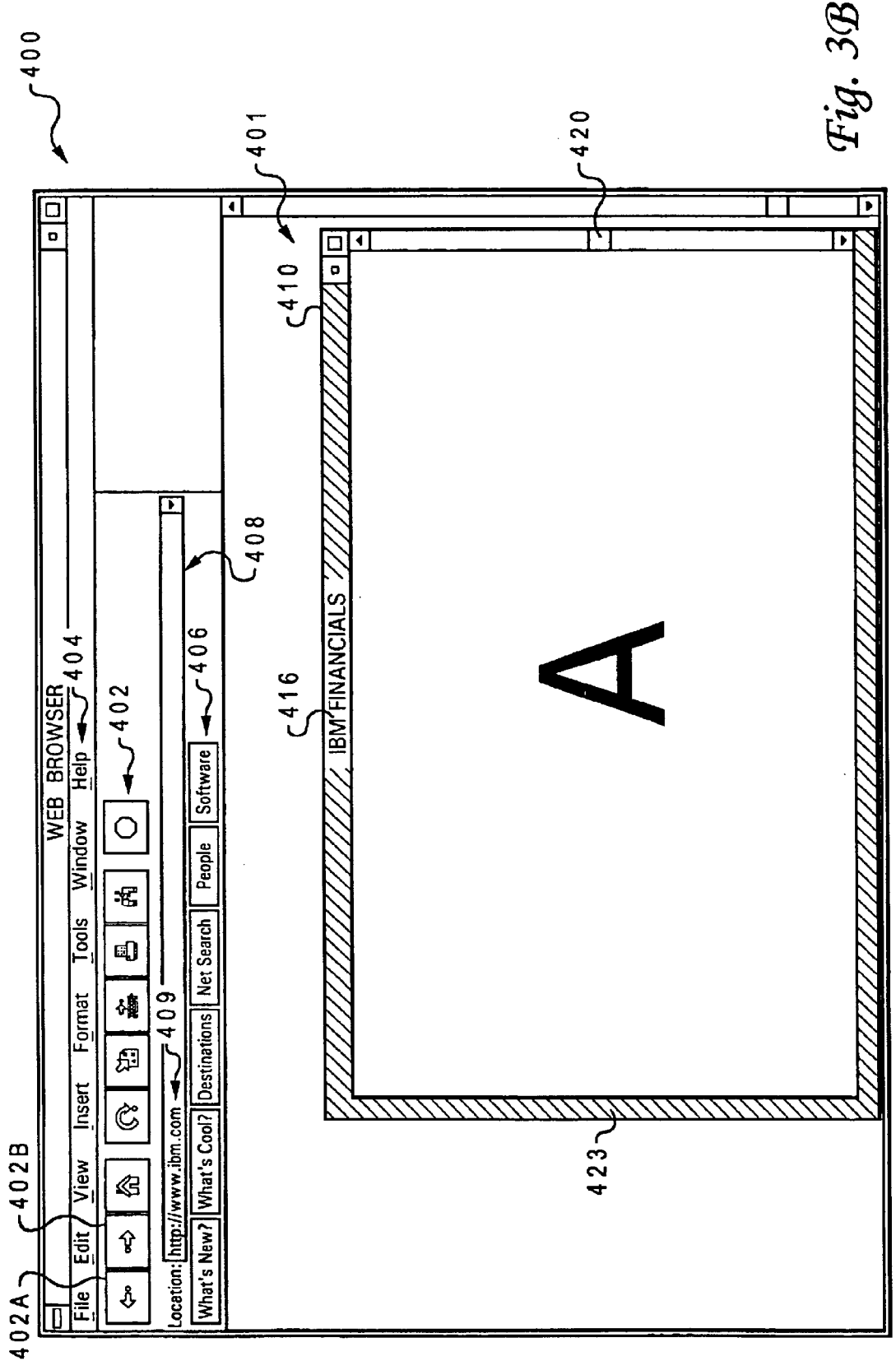

FIGS. 3A and 3B illustrate the web browser 400 and web page 410 of FIG. 2 when the web page 410 is a cached web page according to two embodiments of the invention. In FIG. 2A a cache indicator 421 is presented within the web browser. The cache indicator 421 is displayed only when the web page is cached. Alternatively, it may always be present but highlighted whenever web page is cached. In this way web indicator may toggle between {new} page and {cache} page symbol). The cache indicator 421 may appear over the web page 410 or in other visible location. It may be displayed as a dialog box prior to displaying the web page 410 as described herein, or displayed at predetermined time intervals during the use of the web page 410. In these embodiments, and subsequent embodiments, a user may be provided with the ability to select the location or method of displaying the cache indicator 421. Thus a user may adjust the settings during application setup or at any time during application execution by entering the "setup" location/menu of the application GUI.

FIG. 3B provides similar functionality as FIG. 3A but utilizes a color-coding or shading scheme to indicate to the user that the page is cached. As seen on FIG. 3B, the borders 423 of the web page 410 are shaded, indicating to a user that the web page 410 is cached.

Figures 1, 3C:
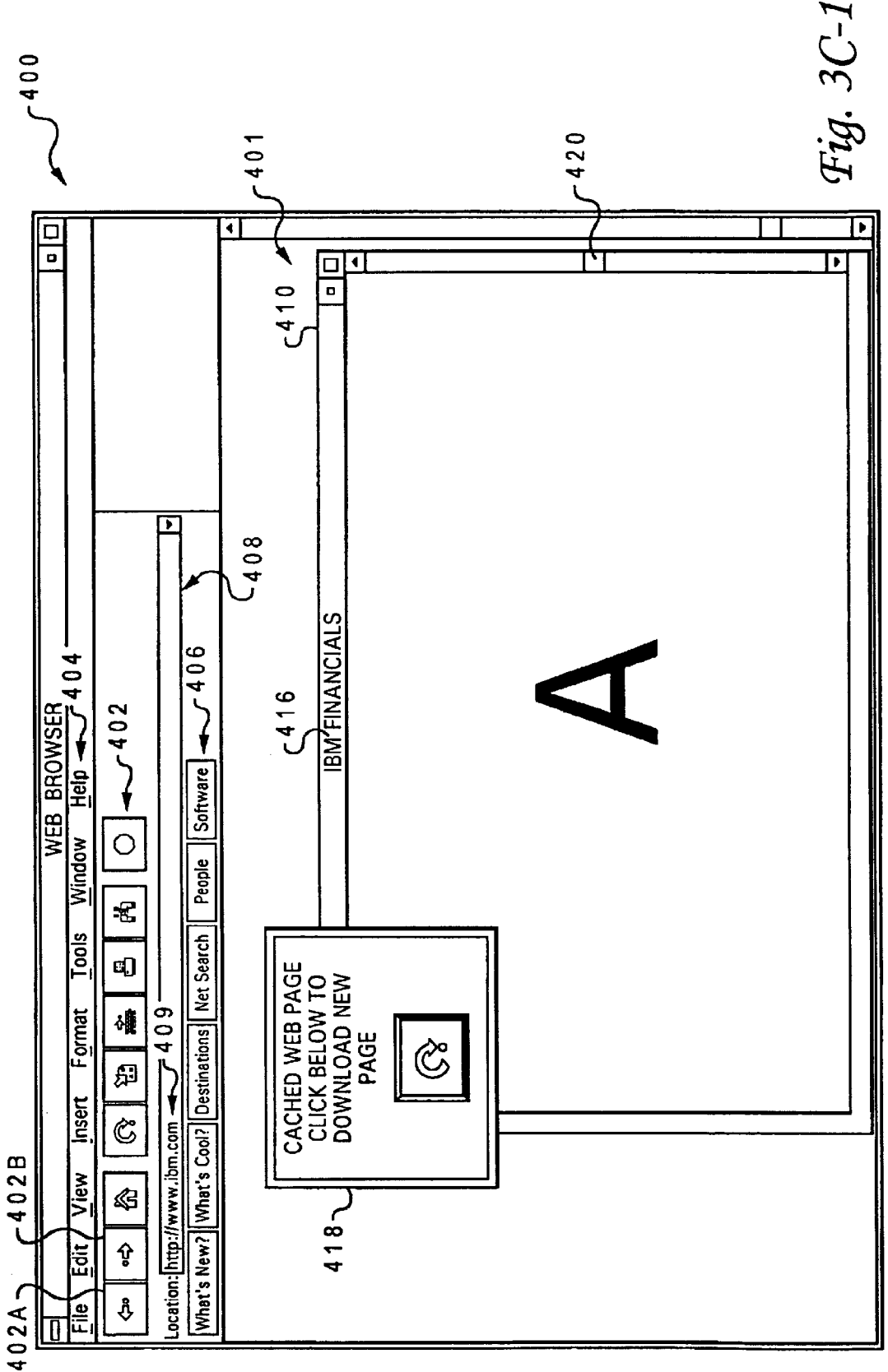
Figures 2, 3C:
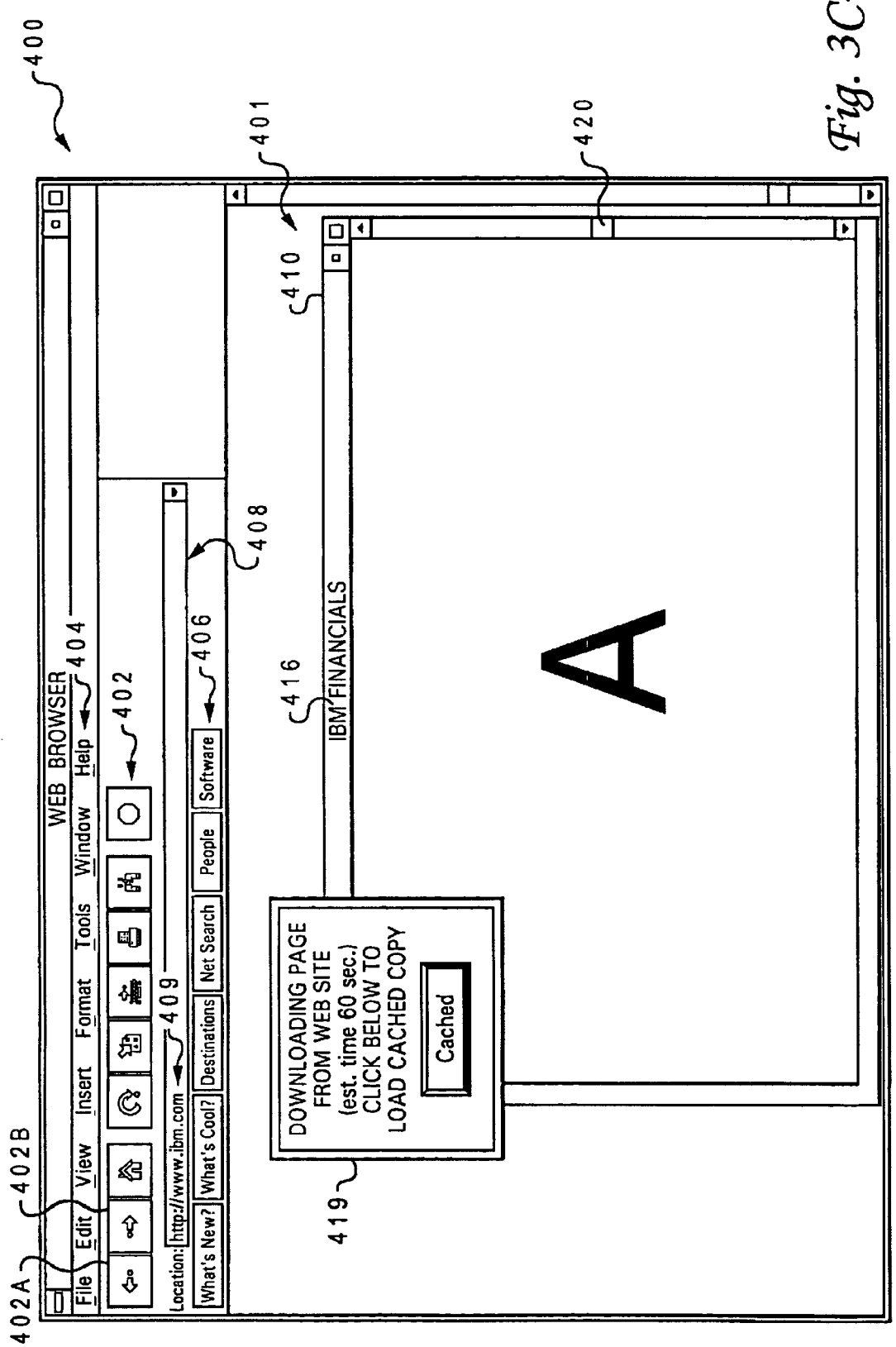

Cache indicator may be a dialog box as in FIGS. 3C-1 and 3C-2 wherein a user is not only notified to the cache status of the web page but also provided with information explaining the cache indicator message and providing the user with various options, such as, refreshing the web page. In the preferred method of this embodiment a second "reload" button is presented in the dialog box 418. The reload button is linked to the functionality of the browser reload button and utilizes the same functional logic to enable a reload. Use of the dialog reload is more convenient in that the user is almost instantaneously reminded to and actually selects the reload button when desired.

In a second method of the above embodiment, the browser may be set to automatically reload the page from the web site. The dialog box 419 then presents the user with an option to cancel the reload, when the user desires the cached page information or the information is not time-sensitive. Also, it is also contemplated that the indicator be used to alert a user when a new page is about to be downloaded in situations where the user wishes to access the contents of the cached page or speed up the page retrieval for information which is not time-sensitive. The dialog box 419 indicates that a new page is about to be downloaded and the user may select the cancel option, which effectuates the retrieval of the cached page. This option would only be present when a cached page exists and the user has previously set the web browser's page request function to retrieve all requests directly from the web site.

The invention also finds applicability in networks which utilizes proxy servers to cache web pages received from the originating server and subsequently provide these proxy-cached pages to a user. In one such implementation, the user is not only made aware that he is using a cached copy of the document, but also provided information about the location of the cached copy (i.e., local cache or proxy cache). Thus the dialog box or indicator may read "cached copy form proxy" or "local cached copy", etc.

Figure 4A:
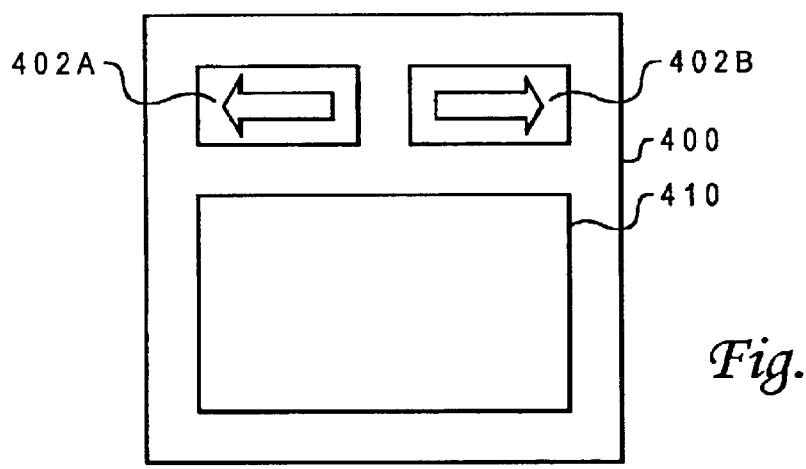
FIGS. 4A–4F are block diagram representations of web browser with web pages and the process of displaying a newly downloaded page and subsequently displaying a cached page in accordance with a preferred embodiment of the present invention.
Figure 4B:
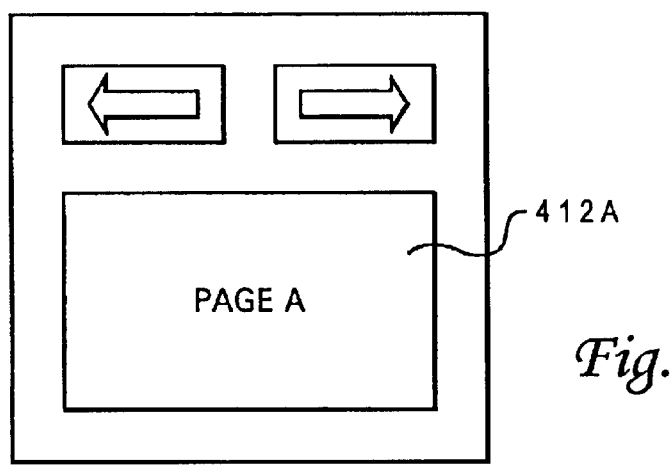
Figure 4C:
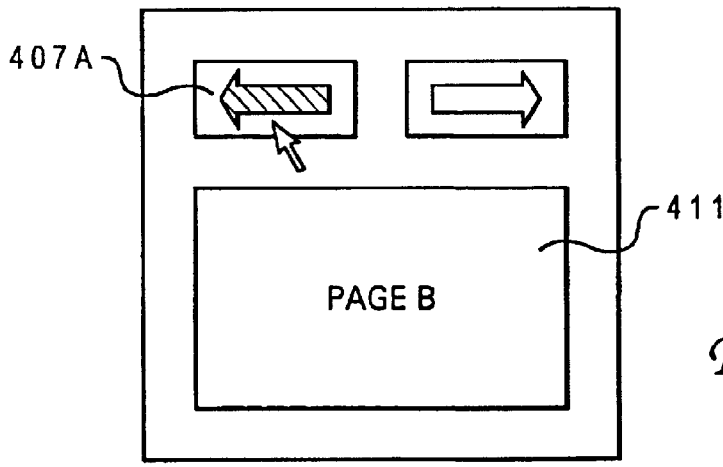
Figure 4D:
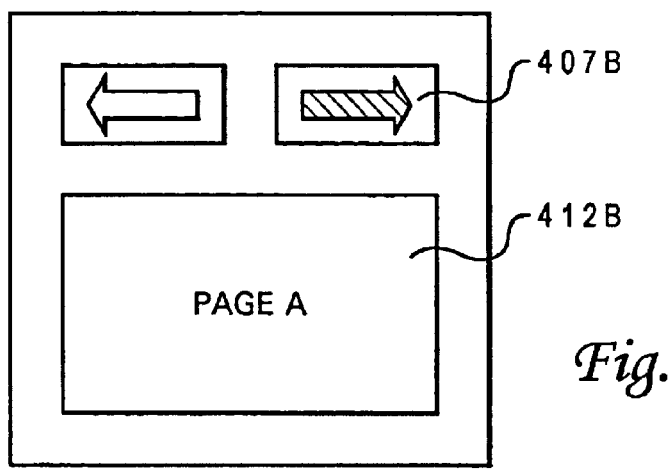
Figure 4E:
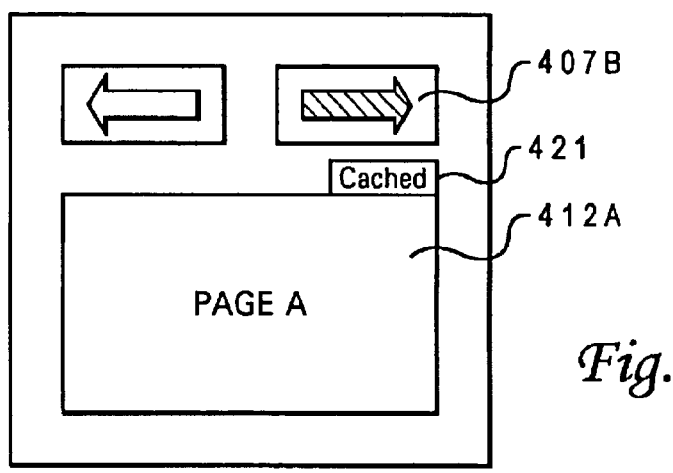
Figure 4F:
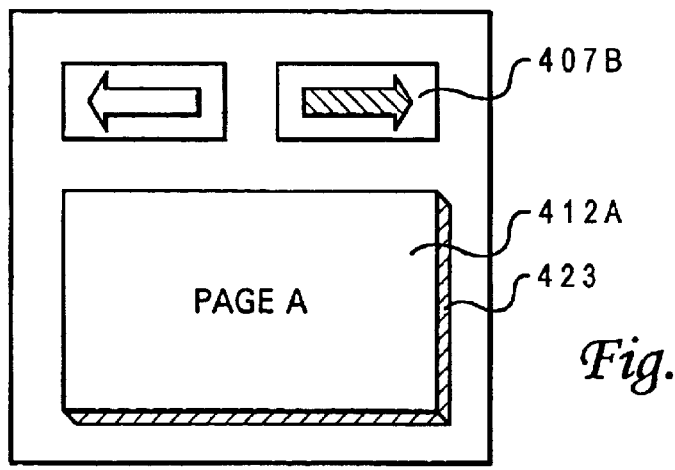

Turning now to FIGS. 4A–4F, there is illustrated a block diagram representation of sequential downloading and subsequent cache retrieval of a web page in response to user input. FIGS. 4A–4F are simplified versions, presented for clarity, of FIGS. 2 and 3. Like elements are numbered the same. In FIG. 4A, web browser 400 is illustrated having a web page area 410 and two scroll/control buttons, back (previous) 402A and forward (next) 402B. Use of these scroll buttons permit a user to return to one of a previously displayed web page in a sequential manner, as those skilled in the art are familiar. Like items on like FIGS. (4B–4F) are not described for the other figures. In FIG. 4B a web page A 412A is downloaded from the Internet (or Intranet) and displayed on in the web page area 410. FIG. 4C illustrates a second web page B 411 which has been downloaded from the Internet. When this occurs, back button 402A is highlighted, indicating to the user that he may return to the first downloaded web page A 412A by selecting highlighted back button 407A. Once the second web page B 411 is downloaded, the first web page is cached (although it may be cached automatically upon its downloading). When the user selects the highlighted return button 407A, one of two events may occur. FIG. 4D illustrates the first event, wherein a newly downloaded version of web page 412B is displayed, having been downloaded from the Internet. FIGS. 4E and 4F illustrate two representations of the second event which may occur. Namely, the originally downloaded and now cached web page A 412A is displayed having been loaded from the local cache of the data processing system. When this occurs, one of two methods of alerting the user that the displayed web page is the cached web page A 412A is utilized. FIG. 4E illustrates a cache indicator 421 atop web page A 412A, while FIG. 4F illustrates a shadowing of the borders 423 of web page A 412A. In each case where a second web page is downloaded, forward button 402B is highlighted to permit user to retrieve second web page A 411.

Although the above illustration assumes the use of the control buttons to re-request the web pages, it is understood by those skilled in the art that other methods of calling a web page address are possible and the invention contemplates all such methods as being fully applicable.

Figure 5:
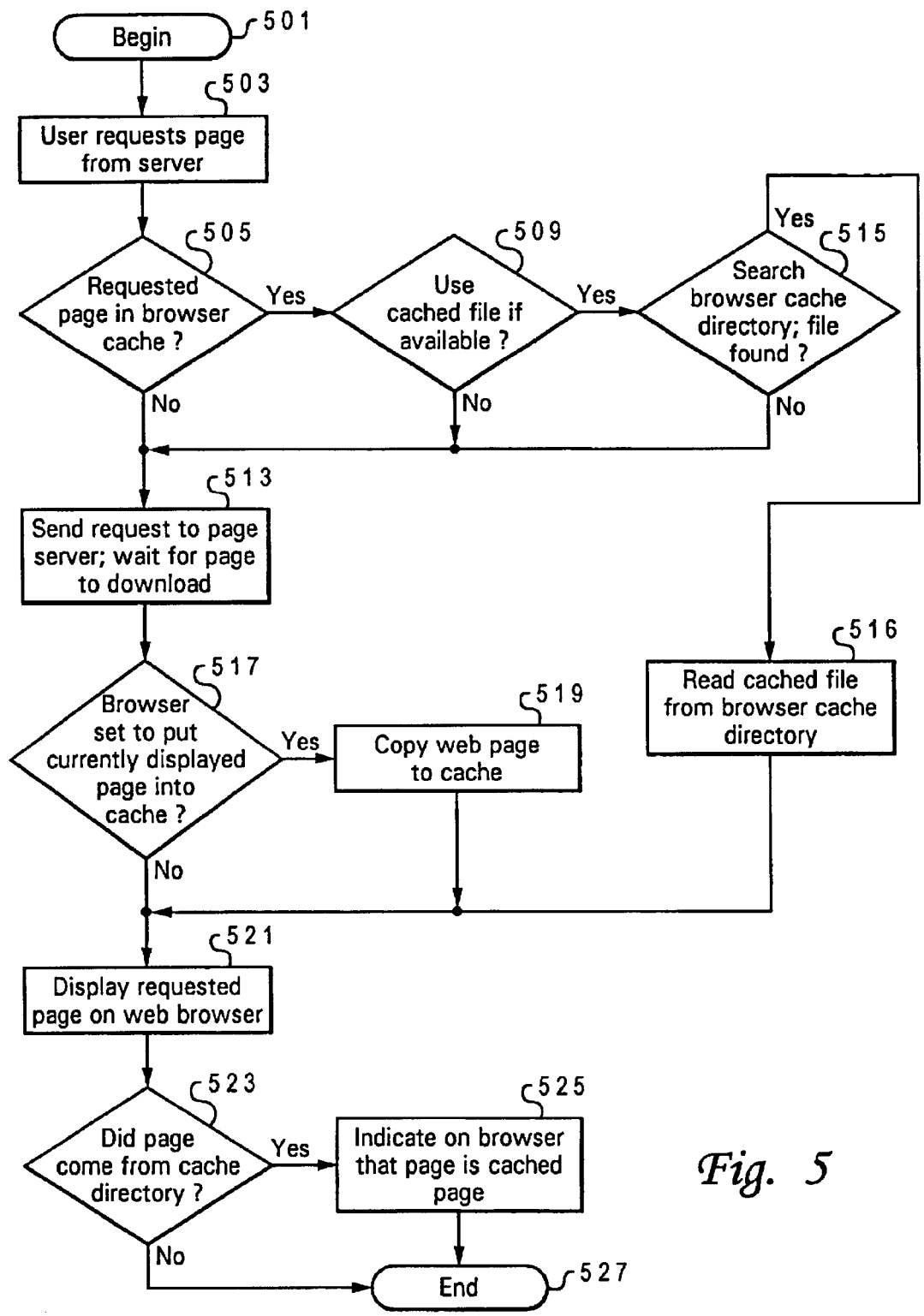
FIG. 5 is a flow chart of the process involved in displaying cache web pages in accordance with the present invention.

FIG. 5 is a flow chart illustrating the processes of one embodiment of the present invention. The process begins (step 501) after the web browser is executed on the data processing system. The user requests a web page (step 503). The request is handled either by a remote server connected to the user data processing system via the Internet (or Intranet) or alternatively by a local browser cache of the data processing system. (i.e., it was previously downloaded) A check is made to determine if the requested page is in the user's browser cache (step 505). If the web page is in the browser cache, the user's preference is read and a determination is made of whether to use the cached file instead of downloading the file from the server (step 509) based on the user preference. The user preference may be entered during setup of the web browser application or on a prompt to the user prior to retrieving the web page. If the cache file is to be used, the processor searches for the cached file in the user's browser cache directory (step 515). If the cache file is found, then it is read from the user's browser cache directory (step 516). The web page is then displayed with a cache indicator (step 517) alerting the user that the displayed web page was retrieved from the cache. The user may then select the refresh button to force a download from the server via the Internet. When this page is reloaded with a non-cached web page, the cached-page indicator is removed to show the new status of the displayed page. If, however, the cache file is not found (i.e., the requested page is not cached or has been purged from the cache file directory), the remote server is contacted and the web page downloaded via the Internet (step 513).

When a new web page is downloaded, it is automatically stored in the cache unless the user has changed the browser settings. A check is thus made to determine if the browser is set to store new page in cache (step 517) and the page is stored (step 519) when it has been set. The requested page is then displayed on the web browser (step 521). A final determination of the source of the displayed web page is made (step 523), whereby, if the page was retrieved from the cache, an indicator is displayed on the web browser (step 525). The process then ends (step 527).

In the preferred embodiment, no indication is provided when the web page is downloaded from the server. Thus according to the invention, when a cached page is displayed, a visual indicator is used to notify the user that they are reading from a cached file. The user is thus made aware and EKE can hit the "reload" button on the browser to cause a new page to be downloaded from a web page server. The visual indicator may be, for example, a small colored square that shows up at the bottom corner of a browser display area. Alternate methods have previously been discussed.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the foregoing description relates to the implementation of the invention on a large wide area network like the Internet, the invention is equally applicable to smaller networks such as a local area network (LAN) or Intranet. This non-Internet based application along with its functional differences are presented in related application (Docket No. AUS990898US1) file concurrently herewith. It is therefore contemplated that such modifications can be made without departing from the spirit or scope of the present invention as defined in the appended claims.

What is claimed is:

1. In a data processing system having a display device and associated storage facility, a method for displaying a web page comprising:

determining when said web page has a cached copy within said storage facility;

displaying said cache copy of said web page on the display device when a user-selectable display option indicates initial display of said cached copy when available;

downloading a new copy of said web page when said user-selectable display option indicates display of a new copy of said web page irrespective of an availability of said cache copy; and indicating when said cache copy of said web page was loaded from said storage facility.

2. The method of claim 1, wherein said indicating step further includes:

visually displaying a cache copy indicator within said browser application, wherein said cache copy indicator alerts a user of said requested web page that the displayed web page is a cached web page.

3. The method of claim 2, wherein said visually displaying step includes:

color-coding a display area of said web page, wherein a first color is associated with a portion of said web page from among the entire web page and a border of said web page to represent that said web page is a cached copy of said web page and wherein when a second color is associated with said portion said second color represents that said web page is not a cached copy of said web page; and displaying said web page in said first color when said web page is cached and in said second color when said web page is non-cached.

4. The method of claim 1, further comprising:

displaying a source location from which said web page is retrieved when said web page is displayed, wherein said source location is identified to a user as one of a download site address; a local cache directory location or a network cache directory location.

5. The method of claim 1, wherein:

said displaying step includes the step of retrieving said cached copy of said web page from a remote proxy server cache; and said indicating step further indicates that said web page was previously retrieved from said remote proxy server cache.

6. The method of claim 1, further comprising:

enabling user selection of said user-selectable display option among retrieval from cached copy or download from source; and wherein said displaying step is in response to a user input from among a user selection of a scrolled function when said web page is a previously downloaded web page, a user selection of a web page identifier from a history list of previously displayed web pages, and a user input of said web page address into a search area of a web browser.

7. The method of claim 1, wherein said displaying step further includes:

concurrently displaying a dialog box with instructions for a requestor of said web page to select a refresh option when said requester does not want said cached copy of said web page, wherein selection of said refresh option automatically initiates a download of said web page; and timing out the concurrent display of said dialog box if no user selection of said refresh option occurs within a pre-established time.

8. In a data processing system having a display device and associated storage facility, a system for displaying a web page comprising:

means for determining when said web page has a cached copy within said storage facility;

means for displaying said cache copy of said web page on the web browser when a user-selectable display option indicates initial display of said cached copy when available;

means for downloading a new copy of said web page when said user-selectable display option indicates display of a new copy of said web page irrespective of an availability of said cache copy; and means for indicating when said cache copy of said web page loaded was from said storage facility.

9. The system of claim 8, wherein said indicating means further includes:

means for visually displaying a cache copy indicator within said browser application, wherein said cache copy indicator alerts a user of said requested web page that the displayed web page is a cached web page.

10. The system of claim 9, wherein said visually displaying means includes:

means for color-coding a display area of said web page, wherein a first color is associated with a portion of said web page from among the entire web page and a border of said web page to represent that said web page is a cached copy of said web page and wherein when a second color is associated with s aid portion s aid second color represents that said web page is not a cached copy of said web page; and displaying said web page in said first color when said web page is cached and in said second color when said web page is non-cached.

11. The system of claim 8, further comprising:

means for displaying a source location from which said web page is retrieved when said web page is displayed, wherein said source location is identified to a user as one of a download site address; a local cache directory location or a network cache directory location.

12. The system of claim 8, wherein:

said displaying means includes means for retrieving said cached copy of said web page from a remote proxy server cache; and said indicating means further indicates that said web page retrieved from said remote proxy server cache.

13. The system of claim 8, further comprising:

means for enabling user selection of said user-selectable display option among retrieval from cached copy or download from source; and wherein said displaying means is in response to a user input from among a user selection of a scrolled function when said web page is a previously downloaded web page, a user selection of a web page identifier from a history list of previously displayed web pages, and a user input of said web page address into a search area of a web browser.

14. The system of claim 8, wherein said displaying means further includes:

means for concurrently displaying a dialog box with instructions for a requester of said web page to select a refresh option when said requester does not want said cached copy of said web page, wherein selection of said refresh option automatically initiates a download of said web page; and means for timing out the concurrent display of said dialog box if no user selection of said refresh option occurs within a pre-established time.

15. A data processing system comprising:

a processor and storage medium;

input/output (I/O) devices including a display output device and user-selection input device;

an operating system executed by said processor; and a web browser application running on said processor, said web browser application including:

means for coupling said system to an external network having a remote server;

means for downloading a web page from said remote server;

means for caching said downloaded web page into said storage medium;

means for loading a web page into a display feature of said web browser application and displaying said web page on said display output device;

means for indicating whether said web page is a cache web page;

means for color-coding a display area of said web page, wherein a first color is associated with a portion of said web page from among the entire web page and a border of said web page to represent that said web page is a cached copy of said web page and wherein when a second color is associated with said portion said second color represents that said web page is not a cached copy of said web page;

means for concurrently displaying a dialog box with instructions for a requestor of said web page to select a refresh option when said requester does not want said cached copy of said web page, wherein selection of said refresh option automatically initiates a download of said web page;

means for timing out the concurrent display of said dialog box if no user selection of said refresh option occurs within a pre-established time; and means for displaying a source location from which said web page is retrieved when said web page is displayed, wherein said source location is identified to a user as one of a download site address; a local cache directory location or a network cache directory location.

16. A computer program product for displaying a web page in a data processing system having a display device and associated storage facility, said program product comprising:

a computer readable storage medium;

program instructions stored on said storage medium for:

determining when said web page has a cached copy within said storage facility;

displaying said cache copy of said web page on a web browser when a user-selectable display option indicates initial display of said cached copy when available;

downloading a new copy of said web page when said user-selectable display option indicates display of a new copy of said web page irrespective of an availability of said cache copy; and indicating when said cache copy of said web page loaded was said storage facility.

17. The program product of claim 16, wherein said program instructions for said indicating step further includes program instructions for:

visually displaying a cache copy indicator within said browser application, wherein said cache copy indicator alerts a user of said requested web page that the displayed web page is a cached web page.

18. The program product of claim 17, wherein said program instructions for said visually displaying step includes program instructions for:

color-coding a display area of said web page, wherein a fist color is associated with a portion of said web page from among the entire web page and a border of said web page to represent that said web page is a cached copy of said web page and wherein when a second color is associated with said portion said second color represents that said web page is not a cached copy of said web page; and displaying said web page in said first color when said web page is cached and in said second color when said web page is non-ached.

19. The program product of claim 16, further comprising:

program instructions for displaying a source location from which said web page is retrieved when said web page is displayed, wherein said source location is identified to a user as one of a download site address; a local cache directory, location or a network cache directory location.

20. The program product of claim 16, wherein:

said program instructions for said displaying step includes program instructions for retrieving said cached copy of said web page from a remote proxy server cache; and said program instructions for said indicating step further indicates that said web page retrieved from said remote proxy server cache.

21. The program product of claim 16, further comprising:

program instructions for enabling user selection of said user-selectable display option among retrieval from cached copy or download from source; and wherein said displaying step is in response to a user input from among a user selection of a scrolled function when said web page is a previously downloaded web page, a user selection of a web page identifier from a history list of previously displayed web pages, and a user input of said web page address into a search area of said web browser.

22. The program product of claim 16, wherein said program instructions for said displaying step further includes program instructions for:

concurrently displaying a dialog box with instructions for a requestor of said web page to select a refresh option when said requester does not want said cached copy of said web page, wherein selection of said refresh option automatically initiates a download of said web page; and timing out the concurrent display of said dialog box if no user selection of said refresh option occurs within a pre-established time.

* * * * *